Dec. 17, 1929.     R. O. HENSZEY     1,740,300

HEAT EXCHANGER

Filed Dec. 12, 1928

INVENTOR.

Roy O. Henszey

BY

Erwin Wheler J. Woodard

ATTORNEYS

Patented Dec. 17, 1929

1,740,300

UNITED STATES PATENT OFFICE

ROY O. HENSZEY, OF OCONOMOWOC, WISCONSIN

HEAT EXCHANGER

Application filed December 12, 1928. Serial No. 325,451.

My invention relates to improvements in heat exchangers of the general type disclosed in my former applications, Serial No. 725,531, filed July 11, 1924, Serial No. 17,413, filed March 21, 1925, and Serial No. 147,122, filed November 8, 1926.

The primary object of this invention is to provide for a substantially continuous delivery of blow off water or concentrate under conditions which will permit a delivery of such water through a small pipe without danger of clogging and without precipitation on the interior surfaces of the pipe, such as would otherwise interfere with heat transfer and eventually fill the pipe, and to accomplish these results while maintaining the highest possible conservation of heat by transfer of the heat units to the feed water and make up water.

Further objects of my invention, as herein set forth, are to provide a heat exchanger in which the blow off water will utilize the grit and other impurities therein to scour the walls of the passages through which such water flows, instead of being deposited thereon, as is done in heat exchangers heretofore used; to provide means for minimizing the effect of destructive vibration, such as results from expansion, accelerating velocities, and unbalanced pressures in blow off pipes receiving water from high pressure boilers; to provide means whereby the destructive cutting and wire drawing effects upon the controlling valves of blow off pipes may be substantially eliminated; to provide a heat exchanger whose passages are so proportioned as to accomplish heat transfer with maximum efficiency from a small stream of blow off water into a larger stream or volume of feed water; to provide means whereby the pressure of the blow off water may be progressively diminished from the boiler to a valve controlled outlet, before reaching which, such pressure will have diminished to the minimum consistent with effective delivery and the maintenance of a sufficiently high velocity to counteract settling and precipitating tendencies and maintain scouring effects; and, in general, to provide means for purifying the water of a boiler continuously by allowing a portion thereof to escape through a heat exchanger with maximum economy, efficiency in heat transfer, durability in structure, and maintenance of boiler water at a constant degree of purity.

In the drawings.

Like parts are identified by the same reference characters throughout the several views.

Figure 1:
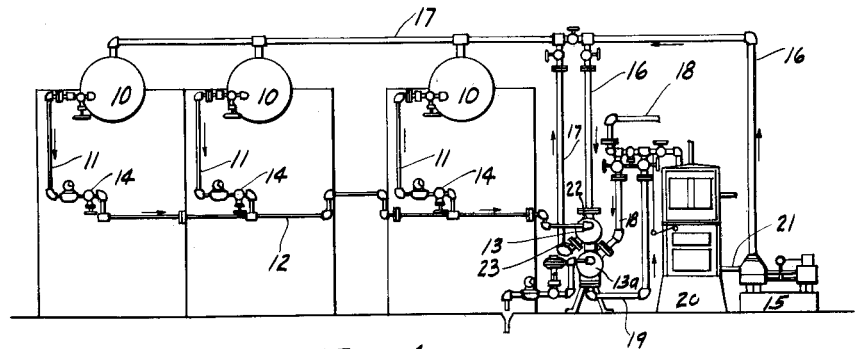
Figure 1 is a diagrammatical illustration of a battery of boilers, each connected with a blow off header leading to a heat exchanger embodying my invention.

Figure 1 shows diagrammatically a battery of boilers 10, which are each provided with a blow off pipe 11, which leads to a header 12 connected with the upper heat exchanger cylinder 13. It may be assumed that the feed water is delivered to the boilers by a pump 15, through pipes 16, to the heat exchanger cylinder 13, and from that cylinder to the boilers through the pipes 17. The make up water is delivered from any suitable source of supply through a pipe 18, which conducts it to the lower heat exchanger cylinder 13ª. From that cylinder the water passes through a pipe 19 to the pre-heater 20 and thence to the pump 15 through the pipe 21. All of the parts thus far described may be assumed to conform to ordinary practice in structure and arrangement. Further description is therefore deemed unnecessary.

Figure 3:
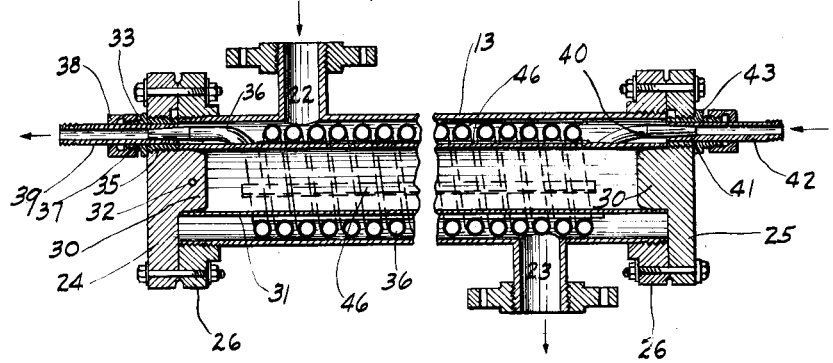
Figure 3 is a fragmentary sectional view showing the end portions of a heat exchanger cylinder, drawn to a plane intersecting the feed water inlet and outlet ports.

The heat exchanger comprises a cylinder 13 for the feed water, a cylinder 13ª for the make up water, and similar associated interior structure and pipe connections for the respective cylinders. The interior construction of the cylinders 13 and 13ª is substantially the same and therefore Figure 3 may be taken as illustrative of either. But in illustrating the pipe connections, Figure 3 is assumed to represent the feed water heat exchanger and therefore the reference character "13" is applied to the outer cylinder wall, and the inlet and outlet ports for the feed water are indicated at 22 and 23 respectively. The pipe 16, shown in Figure 1, connects with the port 22 and the pipe 17 leads from the port 23. The cylinder 13, shown in Figure 3, is connected at its respective ends to header or cap members 24 and 25 by means of collars 26, threaded to the respective ends of the cylinder 13. The header members 24 and 25 are each bolted to an associated collar 26, whereby, when the bolts of the header member 24 are removed, this member and associated parts hereinafter described, may be withdrawn from the cylinder 13.

Figure 2:
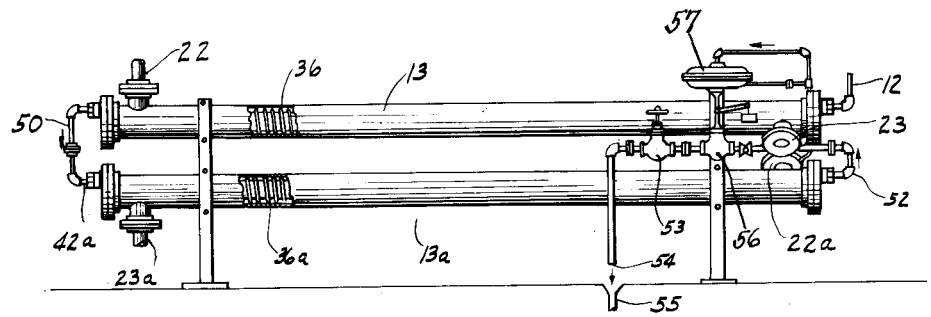
Figure 2 is a side elevation of the heat exchanger with the wall of one of the cylinders broken away to show the helically coiled blow off pipe.

The cylinder 13$^a$ has similar header members, as shown in Figure 2. This cylinder has its inlet port 22$^a$ connected to any suitable source of supply of water not previously used in the system, and which is used to compensate for water and steam leakage, and that otherwise discharged from the system, including the blow off water which is withdrawn to prevent undue concentration of impurities.

It will be observed that the header members 24 and 25 are provided with interiorly projecting tapered bosses 30, which receive the ends of an inner cylinder 31. This inner cylinder is secured to the boss 30 of the header member 24 by a cross pin 32, and it preferably has a water tight fit upon the tapered bosses 30, the surfaces being ground true. The water entering through the inlet port 22 will therefore be received in the annular space between the cylinders 13 and 31, and will flow longitudinally in this annular space to the outlet port 23, which is preferably located on the other side of the cylinder 13 from that having the inlet 22. At one side of its boss 30 the header member 24 has a threaded aperture, which receives a sleeve 35 through which a nipple 39 extends. This nipple receives the end of a tube 36 and is welded thereto. The sleeve 35 has an exteriorly threaded outer end portion 37, which receives a packing nut 38, whereby the joint between the nipple 39 and the sleeve 35 may be protected against leakage by suitable packing. A portion of the pipe 36 within the cylinder 13 is coiled about the inner cylinder 31, as clearly shown in Figure 3, and its other end portion 40 is fitted at 41 within a similar nipple 42 which passes through a sleeve 43, similarly constructed and provided with a packing joint, as above described with reference to the coupling member 35.

The helically coiled portion of the pipe 36 is spaced from the inner cylinder 31 by one or more mounting strips 46. Preferably three of these strips are employed and disposed longitudinally of the inner cylinder 31 in symmetrical relation thereto, i. e.—these strips are preferably equi-distant from each other. The successive helical coils of the pipe 36 are secured to these strips 46, whereby they are spaced from each other and from the supporting pipe 31. When the header member 25 and its associated sleeve 43 is removed from the cylinder 13, and the retaining bolts of the header member 24 are released, as above explained, the pipe 36, inner cylinder 31, and spacing members 46 may all be removed with header 24 and thus withdrawn from the cylinder 13. This facilitates cleansing the annular water cavity between the cylinders 13 and 31, and also facilitates the cleansing of the exterior surfaces of the pipe coil or the making of any necessary repairs.

In the construction illustrated, the cylinder 13, shown in Figure 2, is the feed water cylinder and the cylinder 13$^a$ is the make up water cylinder. The blow off water from the header pipe 12 will be delivered through the nipple 42 to the coiled pipe 36 contained within cylinder 13. From the outlet end of this pipe 36 the blow off water will be received by a connecting pipe 50 and conveyed through the nipple 42$^a$ of the lower cylinder 13$^a$, and through the coiled pipe 36$^a$ of that cylinder, to the pipe connections 52 leading through the casing of a control valve 53, to an outlet at 54, which discharges into a drain, indicated at 55. An automatic valve 56 having a diaphragm control at 57 may regulate the quantity of blow off in proportion to the volume of make up water as described in my co-pending applications.

In the cylinder 13 a portion of the heat of the blow off water will, of course, be transferred to the feed water, the temperature of the feed water being lower than that of the boiler water. The length of the cylinder 13 and of its contained coil of pipe 36 is such that substantially all of the heat units which can be transferred to the feed water in this manner will have been transferred before the blow off water passes out of the cylinder to the connecting pipe 50.

A similar transfer of heat units will then be effected within the cylinder 13$^a$ to the cooler make up water of the latter chamber, so that when the blow off water reaches the outlet pipe 52, it will have given up substantially all of the heat units which, within practical limits, can be returned to the boiler. Its temperature will have been reduced to nearly that of the make up water.

Aside from the structural features above described, my invention has the following novel characteristics: The coiled pipes 36 and 36$^a$ are proportioned in diameter and length to the estimated quantity of water to be blown off under the normal boiler pressures, and the normal quantities of feed water and make up water to be injected into the boilers. In calculating the length and diameter of each pipe 36 and 36$^a$, the friction loss within each pipe is taken into consideration and these pipes are made long enough to largely absorb the boiler pressure in friction loss, while retaining sufficient pressure and kinetic energy at all stages to maintain a pipe scouring velocity.

The friction being uniform, it will be obvious that the pressure reduction will be constant and so graduated at all stages, that there will be no conversion of this water into steam at any stage of its passage through the pipe. Heat transfer is more efficiently accomplished by having the heating liquid circulate at a high velocity and correspondingly increased frictional pressure, not only because of the scouring effects, but also by reason of the constant substitution of particles of liquid from the central portion of the stream for those that have given up their heat to the wall of the tube. If the flow of heating liquid through a tube is slow, the film or layer in actual contact with the tube is cooled and tends to insulate the wall from the hotter liquid in the central portion of the stream, thus reducing the rate of heat transfer.

The friction losses in such coils of pipe are easily determinable from engineering data available to those skilled in the art to which this invention pertains, and the required length and diameter of the coiled pipe and of the annular chamber in which it is located can thus be made to readily conform to the requirements for any given boiler pressure, and to satisfy the average blow off requirements for each system, after determining the ordinary rate of water consumption and the degree of its purity. The rate of heat transfer into the feed water and into the make up water is also determinable from engineering data, after ascertaining the relative temperature of the heating liquid within the coil and the heat absorbing liquid exterior thereto.

For example, in a system having 100 pounds per square inch of boiler pressure and requiring the addition of 3600 gallons of make up water per hour, and an equivalent volume, or more, of feed water, I provide cylinders 13 and 13ª, which are each approximately 12 feet in length, 6 inches in diameter, and having an annular coil receiving water circulating chamber of approximately 1¼ inches in width, or distance from the outer cylinder wall to the inner cylinder wall. Associated with such cylinders, I employ coiled blow off pipes 36 and 36ª, each of approximately 150 feet in length and ⅝ inch inside diameter.

By so constructing the heat exchanger, I am able to leave the outlet valve 53 continuously open under normal conditions of operation with a resulting delivery of ten gallons per minute of blow off water at a velocity which causes the impurities to scour the interior surfaces of the pipes, with no tendency for the impurities to precipitate thereon, or to settle at any point. When the blow off valve 53 is closed, the boiler pressure will, of course, extend throughout the entire blow off line, including pipes 36 and 36ª. But as soon as the valve is opened, the pressure of the liquid at the end of the pipe 36ª will be very greatly reduced thus greatly reducing the wear on the valve seats and exposed surfaces within the valve casings. The erosion may be approximately that required to keep the surfaces clean and free from deposits.

The automatic valve 56 or the hand valve 53 may reduce the flow at times, but when it again opens any sediment, or any incipient deposit will be immediately blown and scoured out.

Owing to the slight reduction in pressure for each foot of blow off pipe, the tendency to vibrate is also greatly reduced. Such vibration, as occurs in the coils, is absorbed by the supporting cage bars, or spacing members, 46, and the coils being welded to these bars, any resulting wear occurs between the bars and the supporting tube 31, which can easily be renewed at small cost by removing the header member 24, as heretofore explained.

It will be understood from the drawings that the water in the supply duct or ducts will flow in a direction opposite that taken by the blow off water, in accordance with common practice, and in order that the progressively cooling blow off water may transfer its heat to the feed water or make up water of correspondingly lower temperature.

I claim:

1. In a heat exchanger, the combination with a boiler, of a boiler supply duct, a blow off duct leading from the boiler through the supply duct, and provided with an outlet, said blow off duct being of such length in proportion to its diameter as to absorb a major portion of the pressure of the boiler water in friction loss, and thereby control the volume independently of valve control, whereby accumulation of sediment and precipitation within the duct may be prevented.

2. In a heat exchanger, the combination with a boiler, of a water supply passage leading thereto, a helically coiled blow off duct leading from the boiler to a normally full open waste delivery outlet and said helically coiled duct having a portion thereof within the supply passage, said blow off duct being of a length and diameter sufficient to absorb such pressure as is required to deliver the desired quantity of concentrate at a scouring velocity.

3. In a heat exchanger, the combination with a boiler, of a water supply passage leading thereto, a helically coiled blow off duct leading from the boiler to a suitable waste delivery outlet and having a helically coiled portion within the supply passage, said blow off duct being of a length and diameter sufficient to absorb the boiler pressure in friction losses, except as to a residual pressure sufficient to deliver the desired quantity at a scouring velocity of flow, and the helically coiled portion within the supply passage having a total area adequate to promote an effective transfer of its available heat units to the boiler supply water.

ROY O. HENSZEY.